United States Patent
Wigard et al.

(10) Patent No.: US 11,982,757 B2
(45) Date of Patent: May 14, 2024

(54) LOCALIZATION ESTIMATION FOR NON-TERRESTRIAL NETWORKS

(71) Applicant: NOKIA TECHNOLOGIES OY, Espoo (FI)

(72) Inventors: Jeroen Wigard, Klarup (DK); István Zsolt Kovács, Aalborg (DK); Mads Lauridsen, Gistrup (DK); Karri Markus Ranta-Aho, Espoo (FI)

(73) Assignee: Nokia Technologies OY, Espoo (FI)

( * ) Notice: Subject to any disclaimer, the term of this patent is extended or adjusted under 35 U.S.C. 154(b) by 437 days.

(21) Appl. No.: 17/309,732

(22) PCT Filed: Feb. 7, 2019

(86) PCT No.: PCT/EP2019/053014
§ 371 (c)(1),
(2) Date: Jun. 16, 2021

(87) PCT Pub. No.: WO2020/160775
PCT Pub. Date: Aug. 13, 2020

(65) Prior Publication Data
US 2022/0018927 A1    Jan. 20, 2022

(51) Int. Cl.
*H04W 64/00*   (2009.01)
*G01S 5/00*    (2006.01)
(Continued)

(52) U.S. Cl.
CPC .......... *G01S 5/0258* (2020.05); *G01S 5/0036* (2013.01); *G01S 5/0249* (2020.05); *G01S 5/06* (2013.01); *G01S 5/14* (2013.01)

(58) Field of Classification Search
CPC .... G01S 5/0258; G01S 5/0036; G01S 5/0249; G01S 5/06; G01S 5/14; G01S 5/02; H04W 60/00; H04W 64/00; H04W 84/06
(Continued)

(56) References Cited

U.S. PATENT DOCUMENTS

| 5,907,809 A | 5/1999 | Molnar et al. |
| 2005/0261833 A1* | 11/2005 | Brosius ................. G01S 5/0036 342/357.43 |

(Continued)

FOREIGN PATENT DOCUMENTS

| EP | 0927362 A1 | 7/1999 |
| TW | 201902276 A | 1/2019 |

OTHER PUBLICATIONS

Office Action for European Application No. 19704298.9, dated Jun. 12, 2023, 7 pages.

(Continued)

*Primary Examiner* — Tanmay K Shah
(74) *Attorney, Agent, or Firm* — Lippes Mathias LLP

(57) ABSTRACT

It is provided a method, comprising measuring, during a period, a first time of arrival (TOA) of a first signal from a first satellite, a second TOA of a second signal from a second satellite, and a third TOA of a third signal from a third satellite; reporting, after the period has elapsed, the first TOA along with the first cell identifier and a first parameter enabling to derive a transmit time of the first signal, the second TOA along with the second cell identifier and a second parameter enabling to derive a transmit time of the second signal, and the third TOA along with the third cell identifier and a third parameter enabling to derive a transmit time of the third signal, wherein the first TOA is measured within a set first interval in the period; the second TOA is measured within a set second interval in the period; the second interval does not overlap the first interval.

17 Claims, 7 Drawing Sheets

(51) Int. Cl.
  *G01S 5/02* (2010.01)
  *G01S 5/06* (2006.01)
  *G01S 5/14* (2006.01)

(58) Field of Classification Search
  USPC .................................................. 455/456.1
  See application file for complete search history.

(56) References Cited

U.S. PATENT DOCUMENTS

| | | | | |
|---|---|---|---|---|
| 2014/0241175 | A1* | 8/2014 | Schell | H04W 4/023 |
| | | | | 370/252 |
| 2016/0306048 | A1* | 10/2016 | Dunn | G04G 7/00 |
| 2018/0343635 | A1 | 11/2018 | Edge et al. | |
| 2020/0154240 | A1* | 5/2020 | Edge | H04W 16/28 |

OTHER PUBLICATIONS

First Examination Report for India Application No. 202147039726, dated Mar. 14, 2022, 8 pages.

International Search Report and Written Opinion for International Application No. PCT/EP2019/053014, dated Apr. 9, 2019, 40 pages.

3GPP TR 38.821, V0.3.0, 3rd Generation Partnership Project; Technical Specification Group Radio Access Network; Solutions for NR to Support Non-Terrestrial Networks (NTN) (Release 16), Nov. 2018; 34 pages.

3GPP TSG RAN WG1 Meeting #AH-1901, R1-1901022; "Potential Positioning Techniques—DL Based Solutions", Taipei, Taiwan; Jan. 21-25, 2019; 6 pages.

3GPP TSG-RAN WG3 #102, R3-186661; "Tracking Area and UE Position in NTN", Spokane, Wa, USA; Nov. 12-16, 2018; 2 pages.

* cited by examiner

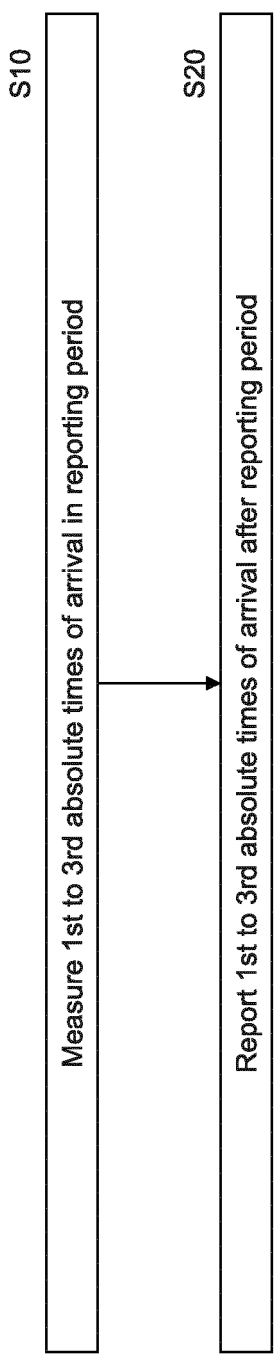
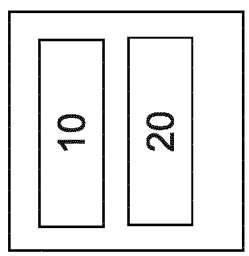
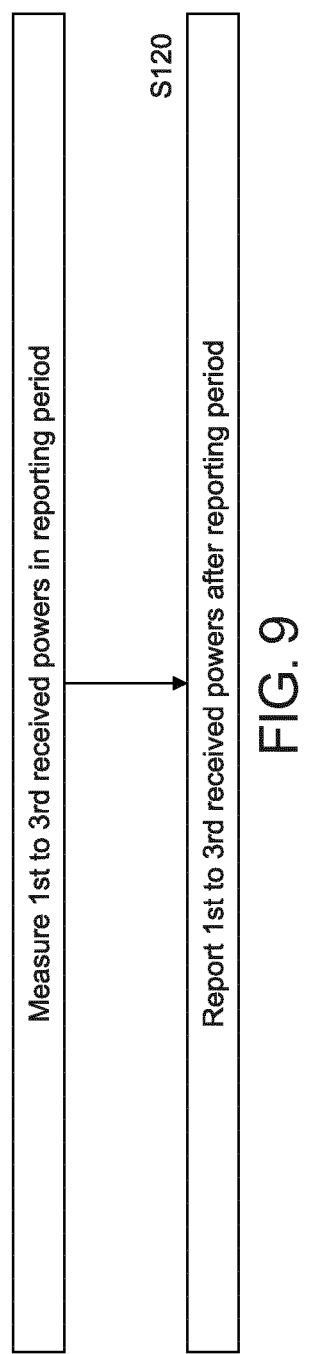
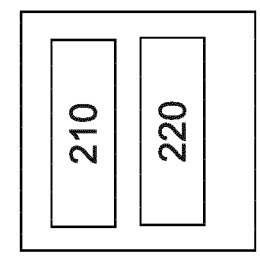
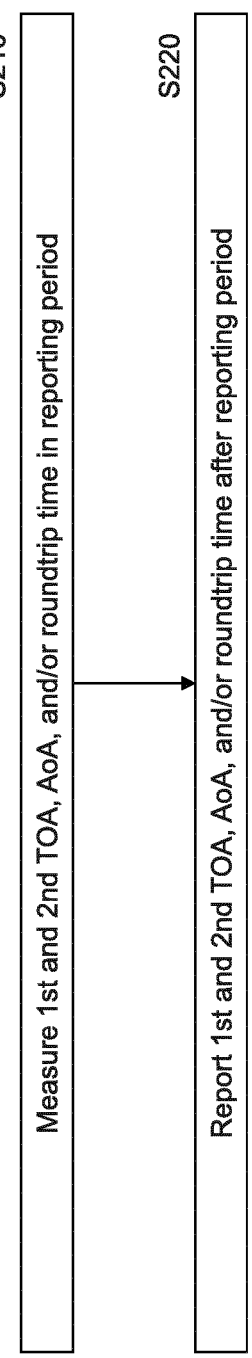

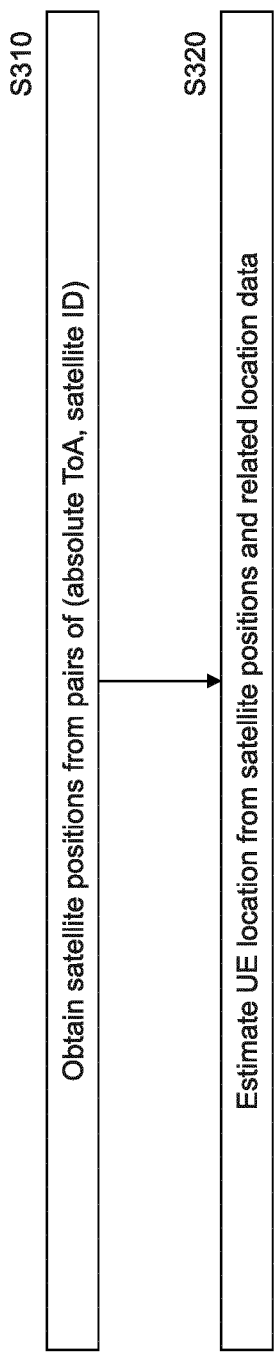
FIG. 12
FIG. 13
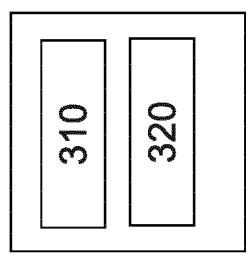
FIG. 14
FIG. 15

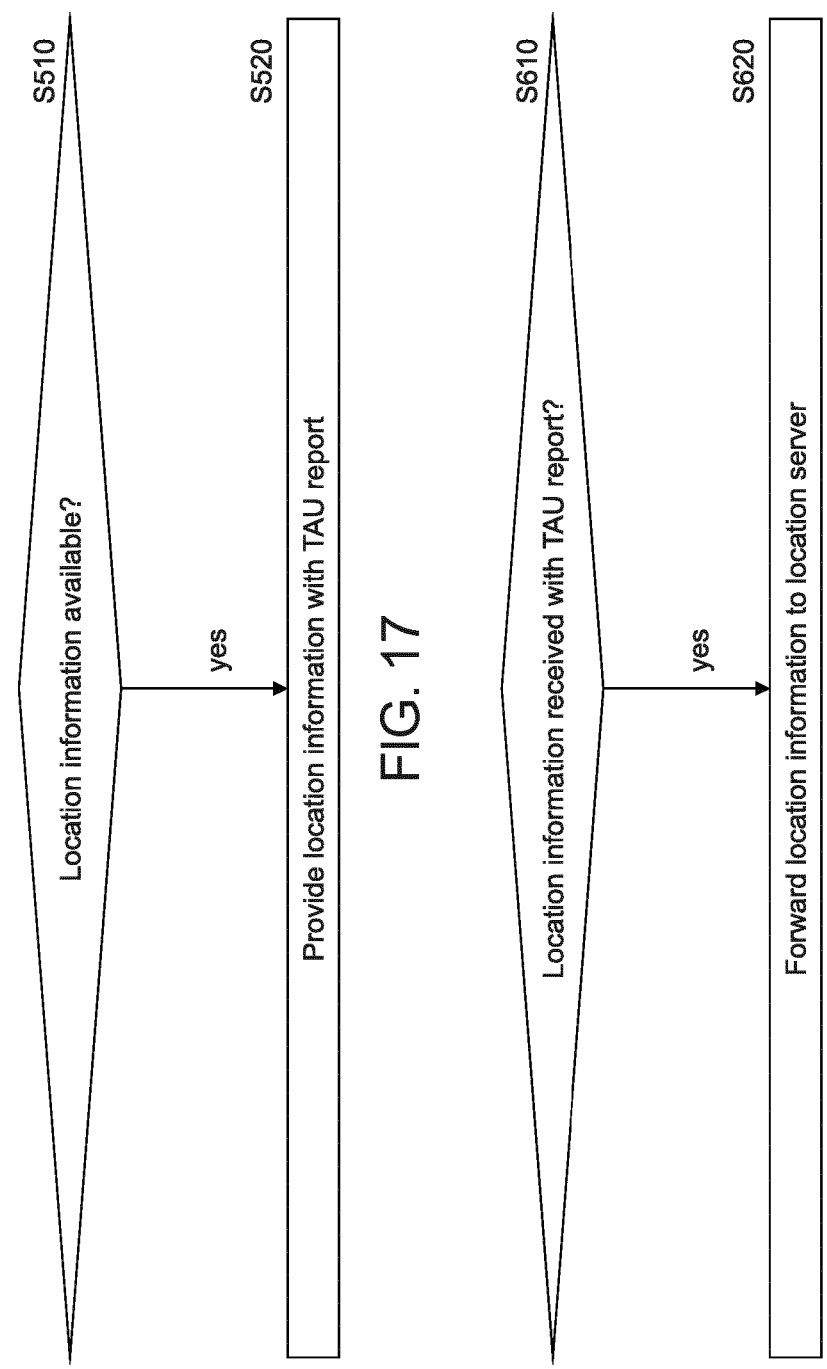
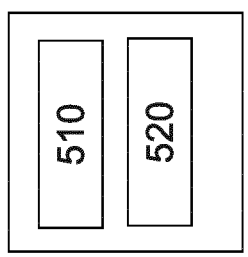
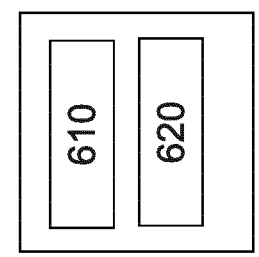
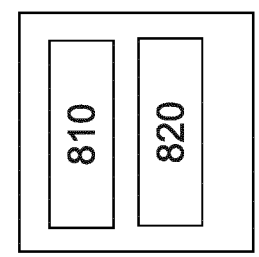

LOCALIZATION ESTIMATION FOR NON-TERRESTRIAL NETWORKS

CROSS-REFERENCE TO RELATED APPLICATIONS

This application is a national stage entry of International Application No. PCT/EP2019/053014, filed Feb. 7, 2019, entitled "LOCALIZATION ESTIMATION FOR NON-TERRESTRIAL NETWORKS" which is hereby incorporated by reference in its entirety.

FIELD OF THE INVENTION

The present invention relates to localization estimation.

Abbreviations
3GPP $3^{rd}$ Generation Partnership Project
3G/4G/5G $3^{rd}/4^{th}/5^{th}$ Generation
AoA Angle of Arrival
ARFCN Absolute radio-frequency channel number
BS Base Station
CU 5G NR gNB central unit
DRMS Demodulation Reference Signals
DU 5G NR gNB distributed unit
ECGI E-UTRAN Cell Global Identifier
eNB evolved NodeB (base Station in 4G)
E-SMLC Enhanced SMLC
FDD Frequency Division Duplex
GEO Geostationary Earth Orbit satellite
GMLC Gateway Mobile Location Centre
gNB Base Station in 5G/NR
GNSS Global Navigation Satellite System
GPS Global Positioning System
HAPS High-Altitude Platform Systems
HD-FDD Half-duplex FDD
ID Identity, Identifier
IoT Internet of Things
LEO Low-Earth Orbit satellite
LMU Location Measurement Unit
MEO Medium Orbit satellite
MIB Master Information Block
MME Mobility Management Entity
MTC Machine-type Communication
NR New Radio
NTN Non-Terrestrial Networks
OTDOA Observed TDOA
PBCH Physical Broadcast Channel
PCI Physical Cell Identifier
PDN Packet Data Network
PSS Primary Synchronization Signals
RAN Radio Access Network
RRC Radio Resource Control
RSTD Reference Signal Time Difference
Rx Receive
SFN System Frame Number
SIB1 System Information Block 1
SIB16 System Information Block 16
SLP SUPL Location Platform
SMLC Serving Mobile Location Center
SRS Sounding Reference Signal
SS Synchronization Sequences
SSS Secondary Synchronization Signals
SSB Synchronization Signal & PBCH Block
SUPL Secure User Plane Location
TAU Tracking Area Update
TDOA Time Difference of Arrival
TOA Time of Arrival
TR Technical Report
TS Technical Specification
Tx Transmit
UAS Unmanned Aircraft System
UE User Equipment
UTDOA Uplink TDOA

BACKGROUND OF THE INVENTION

The 3GPP Non Terrestrial Networks (e.g. in 5G NR) deployments and services have to conform to the existing satellite communication regulations and rules. One of such regulations is the satellite connectivity/service provisioning depending on the user equipment (UE) registration and geographical location. I.e., they have to comply with the requirement that certain countries or regions in the world have restricted or no internet access. These requirements have to be met if the internet access might be provided via satellite, too.

Also, a NTN may apply different charging policies for different countries, national authorities may demand the possibility of lawful intercept, and different countries may demand that certain services are offered or banned. Finally, there are also international areas such as oceans, which may impose yet another set of policies. This is among others described in 3GPP R3-186661, which is discussed in the context of the NR for NTN Study Item in 3GPP TR 38.821.

Note that knowing the position of a UE on a country/geographical area level requires rather high accuracy as UEs can be close to the border and some countries are rather small.

One obvious way to solve the above problem is to use GNSS location information of the UE. In the satellite communications, it is generally assumed that all satellite UEs have GNSS capabilities. Nevertheless,
 i) In the future it is expected that not all NTN UEs have GNSS receivers (e.g. low-cost IoT devices), and/or
 ii) It is generally accepted that GNSS location can be jammed or even faked (e.g. see aviation industry)

In case of 5G NR NTN, we expect that the 3GPP specified location services will be available, and these can provide almost 3-D location of the UE (considering several satellites and orbits). One drawback with this method is that it requires the UE to be in RRC_CONNECTED/ACTIVE mode to send location measurement information back to the serving cell. This involves both large delays and higher radio resource consumption.

Location/positioning services in 3GPP terrestrial networks are typically based on Observed Time Difference of Arrival (OTDOA). This position estimation is based on measuring the Time Difference Of Arrival (TDOA) of special reference signals, embedded into the overall downlink signal, received from different eNB's by the UE. Each of the TDOA measurements describes a hyperbola, where the two focus points (F1, F2) are the two measured eNB's. The measurement needs to be taken at least for three pairs of base stations. The position of the device is the intersection of the three hyperbolas for the three measured base stations A, B, and C (hyperbolas based on time differences A-B, A-C, and B-C; see FIG. 1).

The measurement taken between a pair of eNB's is defined as Reference Signal Time Difference (RSTD) [3GPP TS 36.214]. The measurement is defined as the relative timing difference between a subframe received from the neighboring cell j and corresponding subframe from the serving cell i:

TABLE 1

Definition of RSTD

| Definition | The relative timing difference between the neighbour cell j and the reference cell i, defined as $T_{SubframeRxj} - T_{SubframeRxi}$, where: $T_{SubframeRxj}$ is the time when the UE receives the start of one subframe from cell j $T_{SubframeRxi}$ is the time when the UE receives the corresponding start of one subframe from cell i that is closest in time to the subframe received from cell j. The reference point for the observed subframe time difference shall be the antenna connector of the UE. |
|---|---|

These measurements are taken on the Positioning Reference Signals. The results are reported back to the location server, that may calculate the position of the UE. More information can be found in https://www.qualcomm.com/media/documents/files/otdoa-positioning-in-3gpp-lte.pdf.

3GPP has defined an architecture for location services. A simplified version is shown in FIG. 2. The location server (E-SMLC or SLP) manages OTDOA positioning for a target device by obtaining RSTD measurements from the UE and providing assistance data to the UE to help the UE determining RSTD. The GMLC is the first node in the control plane positioning which performs registration and authorization.

The whole procedure works substantially as follows (partly taken from https://www.gualcomm.com/media/documents/files/otdoa-positioning-in-3gpp-lte.pdf):

In control plane solution, the MME receives a request for some location service associated with a particular target UE from another entity (e.g., GMLC or UE) or the MME itself decides to initiate some location service on behalf of a particular target UE (e.g., for an IMS emergency call from the UE) as described in 3GPP TS 23.271 [1]. The MME then sends a location services request to an E-SMLC. The E-SMLC processes the location services request which include transferring OTDOA assistance data to the target UE. The E-SMLC then returns the result of the location service back to the MME. In the case of a location service requested b, an entity other than the MIME (e.g., UE Or GMLC), the MME returns the location service result to this entity.

The UE report contains the following information:
1. Timestamp of the measurements set in form of the SFN.
2. Identity of the reference cell used for calculating the RSTD (PCI, ARFCN and/or ECGI)
3. Quality of the TOA measurement from the reference cell.
4. Neighbor cell measurement from the reference cell
   Identity of the measured neighbor cell (PCI, ARFCN and/or ECGI)
   RSTD measurement (see above)
   Quality of the RSTD measurement As another option for determining the location of a UE, satellite service tracking/service area management is known: in 3GPP it is recognized that a tracking area/service area is containing information on the location on earth, as it is known in which satellite beam a UE is (or has been). This localization is however very rough and inaccurate information.

As an alternative to UE based measurements, the network side may determine the location of the UE based on various measurements performed by the network:

UTDOA: Uplink relative time difference of arrival measurement, where multiple eNBs time-stamp a received reference signal, and the E-SMLC calculates the UE location similar to OTDOA based on the receive timings and known eNB locations Round trip time: The eNB measures the Tx-to-Rx time difference of a transmitted downlink signal to a UE, and the received uplink signal of the same UE. This is combined with the knowledge of the UE's Rx-to-Tx time difference, either based on UE measurement, or defined UE timing can be used to determine the actual signal over-the-air propagation delay and thus the distance between the UE and the eNB.

Angle of Arrival: An eNB with an antenna array can estimate the receive signal direction, and that information can be used in determination of the UE's location.

Some definitions of 3GPP TS 36.214 for LTE are indicated in Tables 2 to 5:

TABLE 2

Definition of UL-RTOA

| Definition | The UL Relative Time of Arrival ($T_{UL-RTOA}$) is the beginning of subframe i containing SRS received in LMU j, relative to the configurable reference time [13], [14]. The reference point [14] for the UL relative time of arrival shall be the RX antenna connector of the LMU node when LMU has a separate RX antenna or shares RX antenna with eNB and the eNB antenna connector when LMU is integrated in eNB. |
|---|---|

TABLE 3

Definition of AoA

| Definition | AoA defines the estimated angle of a user with respect to a reference direction. The reference direction for this measurement shall be the geographical North, positive in a counter-clockwise direction. The AoA is determined at the eNB antenna for an UL channel corresponding to this UE. |
|---|---|

TABLE 4

Definition of roud-trip time triggered by eNB

| Definition | The eNB Rx − Tx time difference is defined as $T_{eNB-RX} - T_{eNB-TX}$ Where: $T_{eNB-RX}$ is the eNB received timing of uplink radio frame #i, defined by the first detected path in time. The reference point for $T_{eNB-RX}$ shall be the Rx antenna connector. $T_{eNB-TX}$ is the eNB transmit timing of downlink radio frame #i. The reference point for $T_{eNB-TX}$ shall be the Tx antenna connector. |
|---|---|

TABLE 5

Definition of round-trip time triggered by UE

| Definition | The UE Rx − Tx time difference is defined as $T_{UE-RX} - T_{UE-TX}$ Where: $T_{UE-RX}$ is the UE received timing of downlink radio frame #i from the serving cell, defined by the first detected path in time. $T_{UE-TX}$ is the UE transmit timing of uplink radio frame #i. The reference point for the UE Rx − Tx time difference measurement shall be the UE antenna connector. For a HD-FDD UE, if the UE does not receive any DL transmission in radio frame #i, it shall compensate for the difference in the received timing of radio frame #i and the radio frame in which it did receive a DL transmission used for $T_{UE-RX}$ estimation. |
|---|---|

NTN platforms may comprise any of the following types:

TABLE 6

NTN platforms

| Platforms | Altitude range | Orbit | Typical beam footprint size |
|---|---|---|---|
| Low-Earth Orbit (LEO) satellite | 300-1500 km | Circular around the earth | 100-500 km |
| Medium-Earth Orbit (MEO) satellite | 7000-25000 km | | 100-500 km |
| Geostationary Earth Orbit (GEO) satellite | 35 786 km | notional station keeping position fixed in terms of elevation/azimuth with respect to a given earth point | 200-1000 km |
| UAS platform (including HAPS) | 8-50 km (20 km for HAPS) | | 5-200 km |
| High Elliptical Orbit (HEO) satellite | 400-50000 km | Elliptical around the earth | 200-1000 km |

For LEO, the relative speed of the satellite with respect to earth is in the order of several km per second, e.g. about 7 to 8 km per second.

When a UE is in RRC_IDLE mode, it sends a TAU report when it leaves its current tracking area, or when the UE sends a periodical TAU request message (TAU report) without leaving the current tracking area.

SUMMARY OF THE INVENTION

It is an object of the present invention to improve the prior art.

According to a first aspect of the invention, there is provided an apparatus, comprising means for measuring configured to measure, during a reporting period, a first absolute time of arrival of a first signal from a first satellite identified by a first cell identifier, a second absolute time of arrival of a second signal from a second satellite identified by a second cell identifier, and a third absolute time of arrival of a third signal from a third satellite identified by a third cell identifier;

means for reporting configured to report, after the reporting period has elapsed, an indication of the first absolute time of arrival along with the first cell identifier and a first parameter enabling to derive an absolute transmit time of the first signal, an indication of the second absolute time of arrival along with the second cell identifier and a second parameter enabling to derive an absolute transmit time of the second signal, and an indication of the third absolute time of arrival along with the third cell identifier and a third parameter enabling to derive an absolute transmit time of the third signal, wherein the means for measuring is configured to measure the first absolute time of arrival within a set first measurement interval in the reporting period;

the means for measuring is configured to measure the second absolute time of arrival within a set second measurement interval in the reporting period;

the second measurement interval does not overlap the first measurement interval.

According to a second aspect of the invention, there is provided an apparatus, comprising means for measuring configured to measure, during a reporting period, a first received power of a first signal from a first satellite identified by a first cell identifier, a second received power of a second signal from a second satellite identified by a second cell identifier, and a third received power of a third signal from a third satellite identified by a third cell identifier;

means for reporting configured to report, after the reporting period has elapsed, an indication of the first received power along with the first cell identifier, a first absolute time when the first received power is measured, and a first parameter enabling to derive a transmit power of the first signal, an indication of the second received power along with the second cell identifier, a second absolute time when the second received power is measured, and a second parameter enabling to derive a transmit power of the second signal, and an indication of the third received power along with the third cell identifier, a third absolute time when the third received power is measured, and a third parameter enabling to derive an absolute transmit power of the third signal, wherein the means for measuring is configured to measure the first received power within a set first measurement interval in the reporting period;

the means for measuring is configured to measure the second received power within a set second measurement interval in the reporting period;

the second measurement interval is different from the first measurement interval by a minimum time interval.

According to a third aspect of the invention, there is provided an apparatus, comprising means for measuring configured to measure, within a set first measurement interval during a set reporting period, at least one of a first time of arrival of a first signal from a terminal, a first angle of arrival of a second signal from the terminal, and a first round trip time of a third signal from the terminal and to measure, within a set second measurement interval during the reporting period, at least one of a second time of arrival of a fourth signal from the terminal, a second angle of arrival of a fifth signal from the terminal, and a second round trip time of a sixth signal from the terminal;

means for reporting configured to report, after the reporting period has elapsed, an identification of the terminal, an identification of a satellite comprising the apparatus, an indication of the measured at least one of the first time of arrival, the first angle of arrival, and the first round trip time along with an identification of the respective at least one of the first, second, and third signals, and a respective first absolute measuring time when the respective at least one of the first time of arrival, first angle of arrival, and first roundtrip time is measured, and an indication of the measured at least one of the second time of arrival, the second angle of arrival, and the second round trip time along with an identification of the respective at least one of the fourth, fifth, and sixth signals, and a respective second absolute measuring time when the respective at least one of the second time of arrival, second angle of arrival, and second roundtrip time is measured, wherein the first measurement interval does not overlap the second measurement interval.

According to a fourth aspect of the invention, there is provided an apparatus, comprising means for obtaining configured to obtain, for each of plural pairs of an indication of a respective absolute time of arrival of a respective signal from a respective satellite and a respective satellite identification, a respective position of the respective satellite based on an information about an orbit of the respective satellite;

means for estimating configured to estimate a location of a terminal based on the obtained plural positions and related plural sets of location data, wherein for each of the plural pairs of the respective absolute time of arrival and the respective satellite identification, the respective satellite is identified by the respective satellite identification;

each of the plural sets of location data comprises the respective absolute time of arrival and a respective parameter enabling to derive an absolute transmit time of the respective signal; and at least one of the absolute times of arrival is different from another one of the absolute times of arrival.

According to a fifth aspect of the invention, there is provided an apparatus, comprising means for obtaining configured to obtain, for each of plural pairs of an indication of a respective absolute time of measuring a received power of a respective signal from a respective satellite and a respective satellite identification, a respective position of the respective satellite based on an information about an orbit of the respective satellite;

means for estimating configured to estimate a location of a terminal based on the obtained plural positions and related plural sets of location data, wherein for each of the plural pairs of the respective absolute time of measuring and the respective satellite identification, the respective satellite is identified by the respective satellite identification;

each of the plural sets of location data comprises the respective absolute time of measuring and a respective parameter enabling to derive a transmit power of the respective signal; and least one of the absolute times of measuring is different from another one of the absolute times of measuring.

According to a sixth aspect of the invention, there is provided an apparatus, comprising means for checking configured to check if location information for a terminal comprising the apparatus is available;

means for providing configured to provide the location information together with a tracking area update report of the terminal to a network if the location information is available, wherein the location information enables determining a location of the terminal more precisely than on cell level; and the terminal is in IDLE mode.

According to a seventh aspect of the invention, there is provided an apparatus, comprising means for checking configured to check if a tracking area update report received from a terminal comprises location information of the terminal;

means for forwarding configured to forward an identification of the terminal and the location information to a location server if the tracking area update report comprises the location information, wherein the location information enables determining a location of the terminal more precisely than on cell level.

According to an eighth aspect of the invention, there is provided a method, comprising measuring, during a reporting period, a first absolute time of arrival of a first signal from a first satellite identified by a first cell identifier, a second absolute time of arrival of a second signal from a second satellite identified by a second cell identifier, and a third absolute time of arrival of a third signal from a third satellite identified by a third cell identifier;

reporting, after the reporting period has elapsed, an indication of the first absolute time of arrival along with the first cell identifier and a first parameter enabling to derive an absolute transmit time of the first signal, an indication of the second absolute time of arrival along with the second cell identifier and a second parameter enabling to derive an absolute transmit time of the second signal, and an indication of the third absolute time of arrival along with the third cell identifier and a third parameter enabling to derive an absolute transmit time of the third signal, wherein the first absolute time of arrival is measured within a set first measurement interval in the reporting period;

the second absolute time of arrival is measured within a set second measurement interval in the reporting period;

the second measurement interval does not overlap the first measurement interval.

According to a ninth aspect of the invention, there is provided a method, comprising measuring, during a reporting period, a first received power of a first signal from a first satellite identified by a first cell identifier, a second received power of a second signal from a second satellite identified by a second cell identifier, and a third received power of a third signal from a third satellite identified by a third cell identifier;

reporting, after the reporting period has elapsed, an indication of the first received power along with the first cell identifier, a first absolute time when the first received power is measured, and a first parameter enabling to derive a transmit power of the first signal, an indication of the second received power along with the second cell identifier, a second absolute time when the second received power is measured, and a second parameter enabling to derive a transmit power of the second signal, and an indication of the third received power along with the third cell identifier, a third absolute time when the third received power is measured, and a third parameter enabling to derive an absolute transmit power of the third signal, wherein the first received power is measured within a set first measurement interval in the reporting period;

the second received power is measured within a set second measurement interval in the reporting period;

the second measurement interval is different from the first measurement interval by a minimum time interval.

According to a tenth aspect of the invention, there is provided a method, comprising measuring, within a set first measurement interval during a set reporting period, at least one of a first time of arrival of a first signal from a terminal, a first angle of arrival of a second signal from the terminal, and a first round trip time of a third signal from the terminal and to measure, within a set second measurement interval during the reporting period, at least one of a second time of arrival of a fourth signal from the terminal, a second angle of arrival of a fifth signal from the terminal, and a second round trip time of a sixth signal from the terminal;

reporting, after the reporting period has elapsed, an identification of the terminal, an identification of a satellite comprising an apparatus performing the method, an indication of the measured at least one of the first time of arrival, the first angle of arrival, and the first round trip time along with an identification of the respective at least one of the first, second, and third signals, and a respective first absolute measuring time when the respective at least one of the first time of arrival, first angle of arrival, and first roundtrip time is measured, and an indication of the measured at least one of the second time of arrival, the second angle of arrival, and the second round trip time along with an identification of the respective at least one of the fourth, fifth, and sixth signals, and a respective second absolute measuring time when the respective at least one of the second time of arrival, second angle of arrival, and second roundtrip time is measured, wherein the first measurement interval does not overlap the second measurement interval.

According to a eleventh aspect of the invention, there is provided a method, comprising obtaining, for each of plural pairs of an indication of a respective absolute time of arrival of a respective signal from a respective satellite and a respective satellite identification, a respective position of the respective satellite based on an information about an orbit of the respective satellite;

estimating a location of a terminal based on the obtained plural positions and related plural sets of location data, wherein for each of the plural pairs of the respective absolute time of arrival and the respective satellite identification, the respective satellite is identified by the respective satellite identification;

each of the plural sets of location data comprises the respective absolute time of arrival and a respective parameter enabling to derive an absolute transmit time of the respective signal; and at least one of the absolute times of arrival is different from another one of the absolute times of arrival.

According to a twelfth aspect of the invention, there is provided a method, comprising obtaining, for each of plural pairs of an indication of a respective absolute time of measuring a received power of a respective signal from a respective satellite and a respective satellite identification, a respective position of the respective satellite based on an information about an orbit of the respective satellite;

estimating a location of a terminal based on the obtained plural positions and related plural sets of location data, wherein for each of the plural pairs of the respective absolute time of measuring and the respective satellite identification, the respective satellite is identified by the respective satellite identification;

each of the plural sets of location data comprises the respective absolute time of measuring and a respective parameter enabling to derive a transmit power of the respective signal; and least one of the absolute times of measuring is different from another one of the absolute times of measuring.

According to a thirteenth aspect of the invention, there is provided a method, comprising checking if location information for a terminal comprising an apparatus performing the method is available;

providing the location information together with a tracking area update report of the terminal to a network if the location information is available, wherein the location information enables determining a location of the terminal more precisely than on cell level; and the terminal is in IDLE mode.

According to a fourteenth aspect of the invention, there is provided a method, comprising checking if a tracking area update report received from a terminal comprises location information of the terminal;

forwarding an identification of the terminal and the location information to a location server if the tracking area update report comprises the location information, wherein the location information enables determining a location of the terminal more precisely than on cell level.

Each of the methods of the eighth to fourteenth aspects may be a method for location estimation.

According to a fifteenth aspect of the invention, there is provided a computer program product comprising a set of instructions which, when executed on an apparatus, is configured to cause the apparatus to carry out the method according to any of the eighth to fourteenth aspects. The computer program product may be embodied as a computer-readable medium or directly loadable into a computer.

According to some example embodiments of the invention, at least one of the following advantages may be achieved:

Location of the UE may be determined based on 3GPP mechanisms;

The NTN operator need not to rely on the GNSS receivers implemented in the NTN UEs, and need not to rely on the GNSS location information reported by the UE (this location method actually can be switched off at a push of button in some of the current satellite phones);

The UE location can be used to comply with local/regional regulations regarding the use of satellite terminals;

The location of the UE may be estimated while the UE is in IDLE mode, i.e. before potentially going into RRC ACTIVE/CONNECTED mode;

The energy consumption of the UE required to provide the location reports is significantly reduced compared to the location mechanism which use RRC ACTIVE/CONNECTED mode reporting;

GNSS receiver and GNSS location information not needed

Location information may be provided when needed (not necessarily periodically);

The achieved UE location precision can be controlled by the NTN operator (via TAU periodicity and Location measurement report parameters). It may be different in different regions, thus also complying to privacy laws;

The mechanism is not specific for a given satellite constellation type, and can be tailored to work for any HAPS/LEO/MEO/GEO architecture.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred example embodiments of the present invention which is to be taken in conjunction with the appended drawings, wherein:

FIG. 6 shows an apparatus according to an example embodiment of the invention;

FIG. 7 shows a method according to an example embodiment of the invention;

FIG. 8 shows an apparatus according to an example embodiment of the invention;

FIG. 9 shows a method according to an example embodiment of the invention;

FIG. 10 shows an apparatus according to an example embodiment of the invention;

FIG. 11 shows a method according to an example embodiment of the invention;

FIG. 12 shows an apparatus according to an example embodiment of the invention;

FIG. 13 shows a method according to an example embodiment of the invention;

FIG. 14 shows an apparatus according to an example embodiment of the invention;

FIG. 15 shows a method according to an example embodiment of the invention;

FIG. 16 shows an apparatus according to an example embodiment of the invention;

FIG. 17 shows a method according to an example embodiment of the invention;

FIG. 18 shows an apparatus according to an example embodiment of the invention;

FIG. 19 shows a method according to an example embodiment of the invention; and

FIG. 20 shows an apparatus according to an example embodiment of the invention.

DETAILED DESCRIPTION OF CERTAIN EXAMPLE EMBODIMENTS

Figure 1:
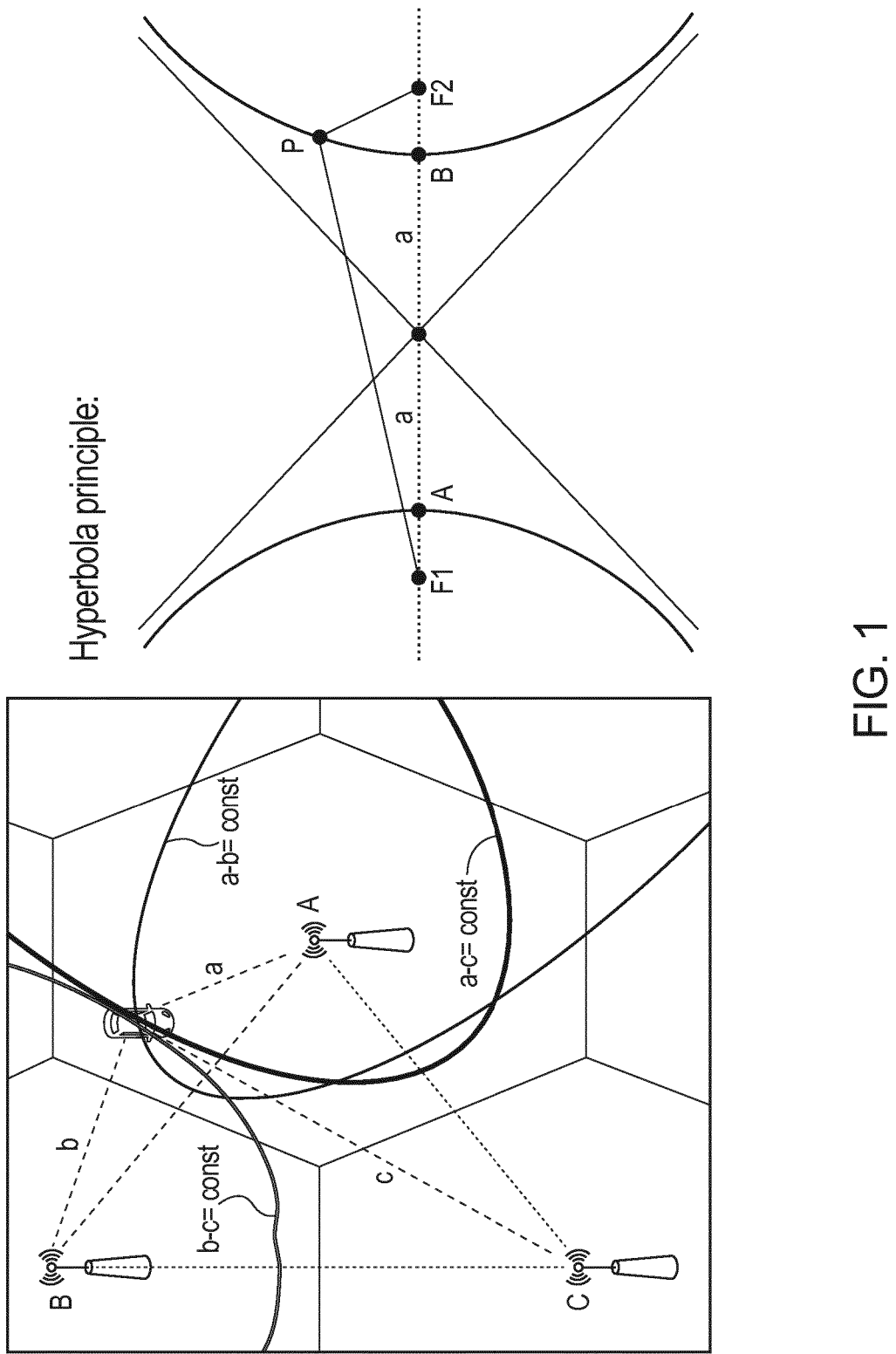
FIG. 1 shows the principle of TDOA measurement based on hyperbolas, taken from http://www.rohde-schwarz-wireless.com/documents/LTELBSWhitePaper_Rohde-Schwarz.pdf
Figure 2:
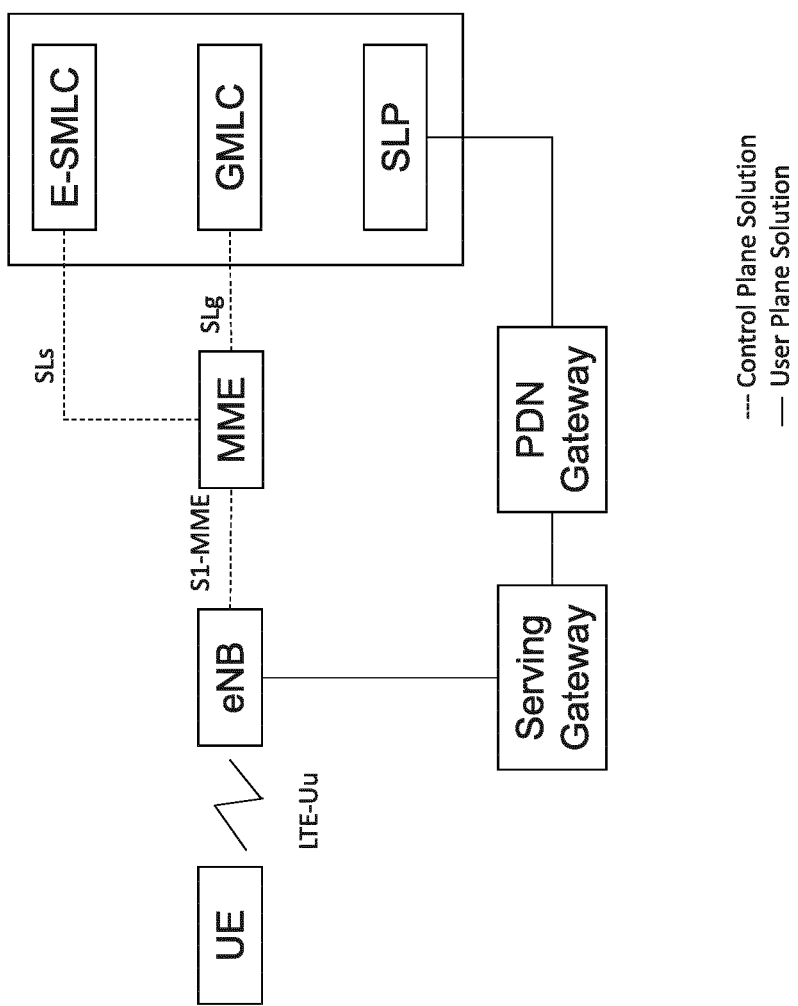
FIG. 2 shows a 3GPP Location services architecture.

Herein below, certain example embodiments of the present invention are described in detail with reference to the accompanying drawings, wherein the features of the example embodiments can be freely combined with each other unless otherwise described. However, it is to be expressly understood that the description of certain example embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

The requirements and regulations outlined above imply that the network needs to know where (in which country, geographical area) a certain UE is. Preferably, the network knows the location of the UE before a service is initiated. If the UE is in active mode (RRC_connected), some methods exists to estimate the location. However, if an inactive UE has to go into the active mode prior to location determination, this would delay the setup of services considerably. Therefore, some example embodiments of the invention provide a method to determine the position of a UE working preferably in idle mode, such that the setup delays are not unnecessarily extended.

As described above, methods exist for terrestrial networks to estimate the position of a UE. However, they rely on the location of three cells to be known and static, which is straightforward for terrestrial networks. However, when considering low orbit satellite systems, cells are moving relative to earth. In addition, a UE might see only one low orbit satellite at a time.

It is preferable that the network can accurately determine the UE location, before the UE becomes RRC_Connected with the network and receives data service, because the network must conform with the aforementioned regulations and policies regarding UE services in specific areas/countries.

Some example embodiments of the invention may use some parts of the location/positioning services in 3GPP terrestrial networks described hereinabove. However, in a satellite network it is often not possible to see 3 base stations (3 satellites acting as base station such as eNB or gNB, or at least acting as a "bent pipe" (transparent in 3GPP terms) i.e. relaying gNB radio transmissions from earth). In addition, it is recommendable that the UE performs 3 measurements of signals from satellites in at least 2 different orbital planes. In order to overcome this potential issue, according to some embodiments of the invention, UE does not report RSTD but the TOA together with timestamp information.

Some example embodiments of the invention provide a new mechanism on RAN level to help locate a NTN UE with a certain spatial granularity using a tamper-proof radio access signalling without the need for GNSS. The mechanism may complement the existing location/positioning services specified by 3GPP which are expected to be also available in 5G NR NTN deployments, and it can also reuse the same architecture. It is in particular applicable to location determination with moving satellites.

Figure 3:
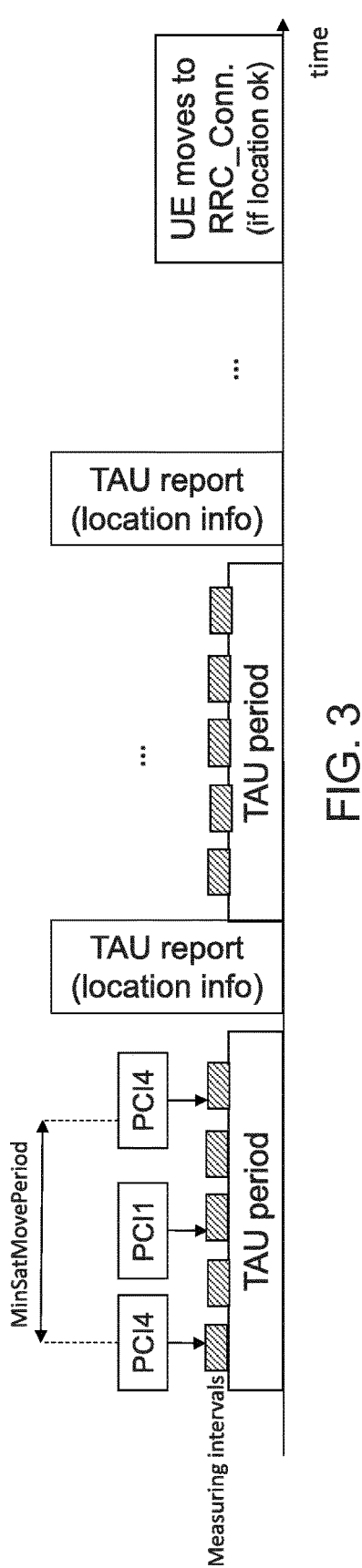
FIG. 3 illustrates an example of timing and time related parameters according to some example embodiments of the invention.

The method works as follows (see also FIG. 3):
1. A TAU reporting period is configured to the UE in RRC_IDLE mode, denoted as TAU period in FIG. 3. TAU period may be preconfigured or configured by the network.
2. The UE measures TOA within plural measuring intervals during the TAU reporting period (e.g. periodically or event driven). The measuring intervals do not overlap each other. In FIG. 3, the measuring intervals are indicated as hashed rectangles. There are at least two measuring intervals within each TAU period (e.g. 5 measuring intervals, as shown in FIG. 3). Within each measuring interval, UE may measure one or more TOAs (absolute times of arrival). The UE is allowed to measure the TOA of a signal from the same satellite several times as long as there is a minimum time period between the measurements. This is to ensure that the satellite has moved enough to be seen at a new position. In FIG. 3, this minimum time is denoted MinSAT-MovePeriod. For example, for a LEO satellite at a height of 7.5 km/s MinSATMovePeriod may be typically in the order of 4-6 minutes. In FIG. 3, since MinSatMovePeriod has passed after the first measurement of the TOA of PCI4, UE may measure TOA of PCI4 a second time within the TAU period. MinSAT-MovePeriod may be predefined or configured by the network. It may depend on the required accuracy of location determination. Within the context of the present application, a TOA is an absolute time. However, it may be expressed by a relative time if the absolute time to which the relative time is related is known. E.g., the absolute time may be the time when the satellite transmits the received signal, and the relative time may be the time difference between the transmit time and the receive time. There may be only one absolute time for plural TOAs represented by different relative times.

3. The relationship between the absolute time at the UE and the absolute time at the network is unambiguous (at least within the required accuracy) and known to the network. Preferably, the absolute time at the UE is the same as the absolute time at the network. The UE may receive an indication of the absolute time from one of the satellites providing a signal for ToA measurement, or from another base station (satellite or terrestrial base station). Based on the received absolute time, UE calculates the UE's absolute time at later points in time by means of a UE internal clock. The UE internal clock should have a sufficient accuracy over time (small drift).

4. Optionally, the UE may be configured with a stop condition. If a stop condition is configured, the UE measures TOAs until the stop condition is fulfilled. Then, it stops measuring until the next TAU reporting period start. Example stop conditions are a minimum number of measuring intervals to measure, a minimum number of TOAs to measure, and a minimum number of different satellites of which TOA is measured. The minimum numbers in the stop conditions may be predefined or configured by the network. In some example embodiments of the invention, the network may switch on and off the respective stop condition. As an example, in FIG. 3, it is assumed that the minimum number of TOA measurements is 3, such that the UE can stop measuring after it measured PCI4 for the second time. The UE may measure the location reference symbols as done in existing location services, or the UE may perform cell detection measurements (i.e. SS/PBCH and MIB decoding). The Cell ID is stored together with the TOA estimate.

5. When the UE sends a TAU request message, the UE indications of the (absolute) TOAs from the (potentially different) satellites along with a respective identifier of the satellite and some indication enabling to obtain the absolute transmit time of the respective signal (an example of a "set of location data") to the network (i.e. via one of the satellites transmitting a signal of which TOA is measured, or via still another satellite to MME or directly to a location server). In some example embodiments, if the TOAs are indicated as relative times, the report may comprise a respective indication of an absolute time for each of the TOAs. An example of the indication enabling to obtain the transmit time may be the transmit time itself, or an indication of the respective signal. In the latter case, the location server may obtain the transmit time from a database storing relationships between the signals and the transmit times based on the indication. The network forwards these sets of location data to the location server.

6. The location server has knowledge of the position of every involved satellite at every time. For example, it may retrieve such information from a database which includes the locations at any given time, or from a dynamic database which is a calculator and provides locations based on requested input time instance. Typically, satellite operators provide such a database. Some websites provide such information even publicly (e.g. for TB broadcast satellites). Thus, it may obtain the position of the satellite(s) from the absolute times. Furthermore, it may derive the absolute transmit times of the signals from the indications included in the location data. Together with the respective absolute TOAs, the location server obtains the propagation time of the signals which correspond to distances to the respective position of the satellite. Based on the obtained positions of the satellite(s) and the distances, the location server may deduct the location of the UE, e.g. by triangulation.

7. If the UE requests to move in to RRC_CONNECTED mode, the location server is aware of the location of the UE. If the location of the UE is such that the request complies with the regulations, the network may move the UE to RRC_CONNECTED, otherwise the request may be refused.

In some example embodiments, the UE calculates TDOAs from the measured TOAs and reports the measured TOAs together with an indication of an absolute time of one of the times of arrival. In some example embodiments, the location server calculates the TDOAs from the received TOAs. Based on the TDOAs and the positions of the satellites, the location server may obtain the position of the UE, too, e.g. by triangulation.

If the calculated TDOAs are from satellites on the same orbit (or if plural TDOAs of the same satellite at different positions are used), the method of hyperbolas, will lead to two possible points for the location of the UE. In that case, the location server may use longer term tracking of the UE to determine which of the two points is the correct one. Alternatively or in addition, in the case of multiple beams from a same satellite, the selected beam for transmission can be used to determine which of the two points is the real location.

In some example embodiments of the invention, the UE location is estimated before the UE becomes RRC_connected, allowing the network to comply with regulations and policies of specific areas/locations. E.g., the method may potentially prevent the UE from accessing the network depending on its location. Some example embodiments of the invention (in particular those, where TOAs are measured at different times for one estimation of the UE's location) are applicable to a UE in RRC_connected state, too. In this case, the UE may report the TOAs, indications enabling obtaining the transmit times, and cell IDs in RRC signaling.

In the above description, TOA is measured. In some example embodiments of the invention, instead or in addition to TOA, the received power of the respective signal may be measured and reported. If a received power is reported via the network to the location server, the report comprises the received power together with an indication of the time, when the received power is measured. The indication enabling obtaining the transmit time is replaced by an indication enabling to obtain the transmit power. From the attenuation of the signal (i.e. from the ratio received power/transmit power), the location server may calculate the distance between the satellite and the UE, and from the distance, it may calculate the propagation time (based on the speed of light). Thus, the location server may calculate the transmit time from the time when the signal is received and the propagation time, and from the transmit time, together with information on the orbit of the satellite, the position of the satellite at the time of transmitting the signal. If the required information (e.g. transmit power) is available at the UE, the UE may perform the calculation(s) and provide the result of the calculation(s) to the location server.

In some example embodiments of the invention, the report may comprise only TOAs and/or TDOAs. In some example embodiments of the invention, the report may comprise only received powers. In some example embodiments of the invention, the report may comprise a mixture of both of them.

Some example embodiments of the invention apply preferably to LEO satellites or HAPS constellations where sufficient number of different satellites can be detected by the UE and the 5G NR cells provided by each satellite/HAPS cover much smaller geographical area compared to GEO/MEO satellites (see Table 6).

In some example embodiments of the invention, the measurements may be conducted in the LEO satellite or HAPS. For these example embodiments, the UE transmits a known signal (e.g. SRS) in a known time/frequency location for the airborne/spaceborne platform to detect the signal. For example, only one moving satellite (or HAPS) may measure the uplink relative time of arrival, angle of arrival, or round trip time several times. If the satellites position is changed sufficiently relative to earth between the measurements, the measurements by the single satellite (or HAPS) correspond to (nearly simultaneous) measurements from plural positions.

Figure 4:
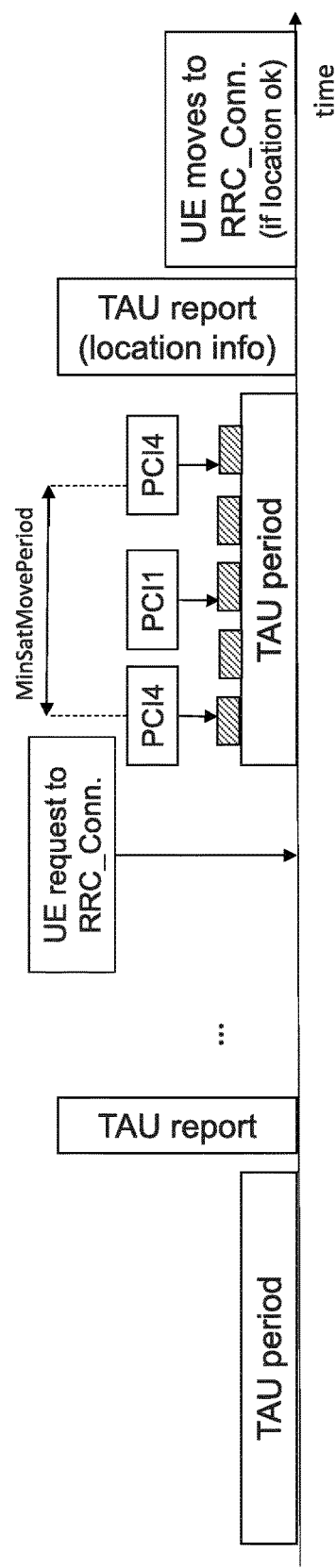
FIG. 4 illustrates an example of timing and time related parameters according to some example embodiments of the invention.

FIG. 4 shows another timing diagram according to some example embodiments of the invention. The timing diagram of FIG. 4 corresponds to that of FIG. 3 except that the UE does not collect location information and/or does not report location information while it is in RRC_IDLE state and does not want to move into RRC_CONNECTED mode. I.e, the TAU reports shown in FIG. 4 (left side) are conventional TAU reports without location information. Only when the UE requests to move into RRC_CONNECTED mode, the UE collects location information (in FIG. 4, it is shown in the same way as in FIG. 3, however this example is not limiting) and reports the location information. Then the location server may determine if the UE is located such that the regulations allow moving the UE to RRC_CONNECTED. If the location of the UE is such that the request complies with the regulations, the network may move the UE to RRC_CONNECTED, otherwise the request may be refused. Instead of in a TAU report, UE may provide the location information in a message in the procedure of becoming RRC_CONNECTED. For example, a newly defined message may be used for this purpose.

Figure 5:
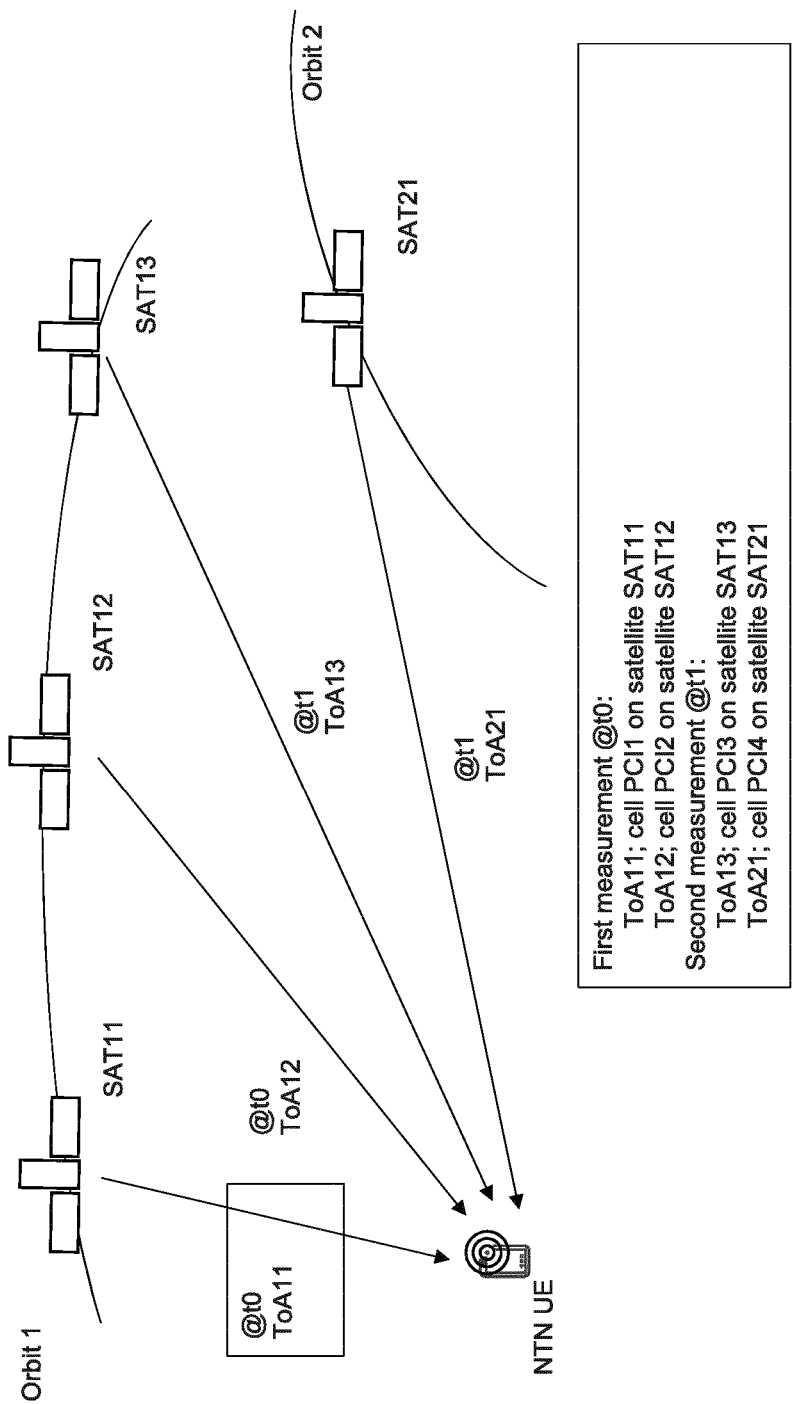
FIG. 5 shows a principle of the cell measurement for location purposes at the NTN UE side using the SS/PBCH and MIB decoding transmitted by different satellites according to some example embodiments of the invention.

FIG. 5 shows a simplified example of how an NTN UE would use the detected and measured cells for location purposes. The network is assumed to have provided the UE basic configuration parameters for periodic TAU reporting, including also parameters for the location measurements and reporting according to some example embodiments of the invention.

In this example, within the TAU period:
At time instant t0 (first measuring period in TAU period) the UE detects two cells and stores their identifiers (e.g. PCIs): PCI1 (of satellite SAT11) and PCI2 (of satellite SAT12), with the corresponding TOA 11 and TOA 12 based on a time reference broadcasted by a gNB (SIB16 with UTC time, 16 µs precision) and a frame/symbol time offset
At time instant t1 (second measuring period in TAU period) the UE detects two cells and stores their identifiers (e.g. PCIs): PCI3 (of satellite SAT13) and PCI4 (of satellite SAT21), with the corresponding TOA 13 and TOA 21 based on the time reference broadcasted by the gNB (SIB16 with UTC time, 16 µs precision) and a frame/symbol time offset.

This detection/measurement sequence continues until a pre-defined/configured stop condition (see above) is met or the TAU period expires.

When a TAU is reported:
1) The UE includes in the TAU report also the stored results of the above described measurements ("location data sets", each comprising e.g. absolute TOA, identification of the received signal, and cell ID; or received power, time of power measurement, identification of the received signal, and cell ID)
2) The NTN RAN (i.e., the location server) uses the location data sets to estimate the location of the UE on Earth at the time the TOA value have been estimated (i.e. in the TAU reporting period, or in a fraction thereof if a stop condition applied)

Step 2) is feasible (within certain accuracy and ambiguity margin) because:
the speed of the UE on Earth (up to 300 m/s according to 3GPP TR 38.811 and 3GPP TR 38.821) is much smaller than the speed of the LEO satellites (~7.8 km/s).
the satellite orbits and, thus, positions of the satellites are known with high accuracy w.r.t. to any geographical location on Earth In the example of FIG. 5, it is shown that the measurements may include satellites on the same orbit or on different orbits. Obviously, for location triangulation purposes, the optimal scenario is when the UE can detect at least 3 satellites (corresponding PCIs), whereof at least one satellite is moving on a different orbit compared to the other detected satellites. However, this scenario cannot be guaranteed to happen in general for all UE locations and/or any satellite constellation. The design of the NTN constellation (orbits and number of satellites) could be based also on this requirement along with other coverage, capacity and orbital restriction.

In some example embodiments of the invention, the detected cells (and corresponding cell identifiers) may be different from each other, or the two or more detected cells (and corresponding cell identifiers) may be the same. In the example following FIG. 5, for example, but not limited to, the PCI1 (of satellite SAT11) and PCI3 (of satellite SAT13) can be same PCI or different PCI. In the example following FIG. 5, for example, but not limited to, the SAT11 and SAT13 can be same satellite or different satellite. According to some example embodiments of the invention, same or different satellite can provide TOA value (and/or other similar location measurement related parameters or location information addressed by example embodiments of the invention) at two different time instant.

The network may track the UE in RRC_IDLE mode even if it does not access the network via satellite but via terrestrial base stations. From the TAU report, the network learns the cell of the IDLE UE. However, sometimes (e.g. in a case, where the UE is in a cell overlapping a border of two countries with different regulations for the internet access) a more precise location information is needed and preferably available before the UE goes into RRC_CONNECTED.

Thus, in some example embodiments of the invention, the TAU report may comprise location information allowing the network to determine the location more precisely than on cell level. One example of such location information are three location data sets as described hereinabove. Another example of such location information is GNSS location data (if available, e.g. from GPS; note that there is a risk that the GNSS data are faked or jammed). If the gNB receives such location information in a TAU report, it forwards the location information to the location server such that the location server can determine the location of the UE with higher accuracy than on cell level.

FIG. 6 shows an apparatus according to an example embodiment of the invention. The apparatus may be a terminal (e.g. UE) or an element thereof. FIG. 7 shows a method according to an example embodiment of the invention. The apparatus according to FIG. 6 may perform the method of FIG. 7 but is not limited to this method. The method of FIG. 7 may be performed by the apparatus of FIG. 6 but is not limited to being performed by this apparatus.

The apparatus comprises means for measuring 10 and means for reporting 20. The means for measuring 10 and means for reporting 20 may be a measuring means and reporting means, respectively. The means for measuring 10 and means for reporting 20 may be a measurer and reporter, respectively. The means for measuring 10 and means for reporting 20 may be a measuring processor and reporting processor, respectively.

The means for measuring 10 to measure, during a reporting period, a first absolute time of arrival of a first signal from a first satellite, a second absolute time of arrival of a second signal from a second satellite, and a third absolute time of arrival of a third signal from a third satellite (S10). The first, second, and third signals identify the first, second, and third satellites by first, second, and third cell identifiers, respectively. The first, second, and third satellites (and corresponding first, second, and third cell identifiers) may be different from each other, or two or three of the first, second, and third satellites (and corresponding first, second, and third cell identifiers) may be the same. The first absolute time of arrival is measured within a set first measurement interval in the reporting period. The second absolute time of arrival is measured within a set second measurement interval in the reporting period. The second measurement interval does not overlap the first measurement interval. For example, the first and second measurement intervals may be predefined within the reporting period. As another example, assuming that the first measurement interval is earlier than the second measurement interval, the end of the first measurement interval may be determined such that it has a first predefined time lag from the measurement of the first absolute time of arrival, the begin of the second measurement interval may be determined such that it has a second predefined time lag from the measurement of the first absolute time of arrival, and the second predefined time lag is larger than the first predefined time lag.

The means for reporting 20 reports, after the reporting period has elapsed:
- an indication of the first absolute time of arrival along with the first cell identifier and a first parameter enabling to derive an absolute transmit time of the first signal,
- an indication of the second absolute time of arrival along with the second cell identifier and a second parameter enabling to derive an absolute transmit time of the second signal, and
- an indication of the third absolute time of arrival along with the third cell identifier and a third parameter enabling to derive an absolute transmit time of the third signal.

Each of the first to third parameters may comprise the absolute transmit time of the respective signal. Each of the first to third parameters may comprise an identification of the respective signal. Thus, a location server may derive the absolute transmit time from the identification and a database indicating (directly or by dynamical calculation) the absolute transmit time of the respective signal dependent on the identification of the signal. The means for reporting may report to the network (location server) via a fourth satellite which may be one of the first to third satellites or different from each of the first to third satellites.

FIG. 8 shows an apparatus according to an example embodiment of the invention. The apparatus may be a terminal (e.g. UE) or an element thereof. FIG. 9 shows a method according to an example embodiment of the invention. The apparatus according to FIG. 6 may perform the method of FIG. 9 but is not limited to this method. The method of FIG. 9 may be performed by the apparatus of FIG. 8 but is not limited to being performed by this apparatus.

The apparatus comprises means for measuring 110 and means for reporting 120. The means for measuring 110 and means for reporting 120 may be a measuring means and reporting means, respectively. The means for measuring 110 and means for reporting 120 may be a measurer and reporter, respectively. The means for measuring 110 and means for reporting 120 may be a measuring processor and reporting processor, respectively.

The means for measuring 110 measures, during a reporting period, a first received power of a first signal from a first satellite, a second received power of a second signal from a second satellite, and a third received power of a third signal from a third satellite (S110). The first, second, and third signals identify the first, second, and third satellites by first, second, and third cell identifiers, respectively. The first, second, and third satellites (and corresponding first, second, and third cell identifiers) may be different from each other, or two or three of the first, second, and third satellites (and corresponding first, second, and third cell identifiers) may be the same. The first received power is measured within a set first measurement interval in the reporting period. The second received power is measured within a set second measurement interval in the reporting period. The second measurement interval does not overlap the first measurement interval. For example, the first and second measurement intervals may be predefined within the reporting period. As another example, assuming that the first measurement interval is earlier than the second measurement interval, the end of the first measurement interval may be determined such that it has a first predefined time lag from the measurement of the first received power, the begin of the second measurement interval may be determined such that it has a second predefined time lag from the measurement of the first received power, and the second predefined time lag is larger than the first predefined time lag.

The means for reporting 120 reports, after the reporting period has elapsed:
- an indication of the first received power along with the first cell identifier, a first absolute time when the first received power is measured, and a first parameter enabling to derive a transmit power of the first signal,
- an indication of the second received power along with the second cell identifier, a second absolute time when the second received power is measured, and a second parameter enabling to derive a transmit power of the second signal, and
- an indication of the third received power along with the third cell identifier, a third absolute time when the third received power is measured, and a third parameter enabling to derive an absolute transmit power of the third signal.

Each of the first to third parameters may comprise the transmit power of the respective signal. Each of the first to third parameters may comprise an identification of the respective signal. Thus, a location server may derive the transmit power from the identification and a database indicating (directly or by dynamical calculation) the transmit power of the respective signal dependent on the identification of the signal. The means for reporting may report to the network (location server) via a fourth satellite which may be one of the first to third satellites or different from each of the first to third satellites.

FIG. 10 shows an apparatus according to an example embodiment of the invention. The apparatus may be a satellite or an element thereof. FIG. 11 shows a method according to an example embodiment of the invention. The apparatus according to FIG. 10 may perform the method of FIG. 11 but is not limited to this method. The method of FIG. 11 may be performed by the apparatus of FIG. 10 but is not limited to being performed by this apparatus.

The apparatus comprises means for measuring 210 and means for reporting 220. The means for measuring 210 and means for reporting 220 may be a measuring means and reporting means, respectively. The means for measuring 210 and means for reporting 220 may be a measurer and reporter, respectively. The means for measuring 210 and means for reporting 220 may be a measuring processor and reporting processor, respectively.

The means for measuring 210 measures, within a set first measurement interval during a set reporting period, at least one of a first time of arrival of a first signal from a terminal, a first angle of arrival of a second signal from the terminal, and a first round trip time of a third signal from the terminal and measures, within a set second measurement interval during the reporting period, at least one of a second time of arrival of a fourth signal from the terminal, a second angle of arrival of a fifth signal from the terminal, and a second round trip time of a sixth signal from the terminal (S210). The first measurement interval does not overlap the second measurement interval. For example, the first and second measurement intervals may be predefined within the reporting period. As another example, assuming that the first measurement interval is earlier than the second measurement interval, the end of the first measurement interval may be determined such that it has a first predefined time lag from the measurement performed in the first measurement interval, the begin of the second measurement interval may be determined such that it has a second predefined time lag from the measurement in the first measurement interval, and the second predefined time lag is larger than the first predefined time lag. Each of the first to sixth signals (if applicable) identifies the terminal by a respective terminal identification (e.g. IMSI, MSISDN, etc.).

Different signals may use the same identification of the terminal or different identifications of the terminal.

The means for reporting 220 reports, after the reporting period has elapsed:
- an identification of the terminal,
- an identification of a satellite comprising the apparatus,
- an indication of the measured at least one of the first time of arrival, the first angle of arrival, and the first round trip time along with an identification of the respective at least one of the first, second, and third signals, and a respective first absolute measuring time when the respective at least one of the first time of arrival, first angle of arrival, and first roundtrip time is measured, and
- an indication of the measured at least one of the second time of arrival, the second angle of arrival, and the second round trip time along with an identification of the respective at least one of the fourth, fifth, and sixth signals, and a respective second absolute measuring time when the respective at least one of the second time of arrival, second angle of arrival, and second roundtrip time is measured.

FIG. 12 shows an apparatus according to an example embodiment of the invention. The apparatus may be a location server or an element thereof. FIG. 13 shows a method according to an example embodiment of the invention. The apparatus according to FIG. 12 may perform the method of FIG. 13 but is not limited to this method. The method of FIG. 13 may be performed by the apparatus of FIG. 12 but is not limited to being performed by this apparatus.

The apparatus comprises means for obtaining 310 and means for estimating 320. The means for obtaining 310 and means for estimating 320 may be an obtaining means and estimating means, respectively. The means for obtaining 310 and means for estimating 320 may be an obtainer and estimator, respectively. The means for obtaining 310 and means for estimating 320 may be a obtaining processor and estimating processor, respectively.

The means for obtaining 310 obtains, for each of plural pairs of an indication of a respective absolute time of arrival of a respective signal from a respective satellite and a respective satellite identification, a respective position of the respective satellite based on an information about an orbit of the respective satellite (S310). For each of the plural pairs of the respective absolute time of arrival and the respective satellite identification, the respective satellite is identified by the respective satellite identification. At least one of the absolute times of arrival is different from another one of the absolute times of arrival.

The means for estimating 320 estimates a location of a terminal based on the obtained plural positions and related plural sets of location data (S320). Each of the plural sets of location data comprises the respective absolute time of arrival and a respective parameter enabling to derive an absolute transmit time of the respective signal. Each of the parameters may comprise the absolute transmit time of the respective signal. Each of the parameters may comprise an identification of the respective signal. Thus, a location server may derive the absolute transmit time from the identification and a database indicating (directly or by dynamical calculation) the absolute transmit time of the respective signal dependent on the identification of the signal.

FIG. 14 shows an apparatus according to an example embodiment of the invention. The apparatus may be a location server or an element thereof. FIG. 15 shows a method according to an example embodiment of the invention. The apparatus according to FIG. 14 may perform the method of FIG. 15 but is not limited to this method. The method of FIG. 15 may be performed by the apparatus of FIG. 14 but is not limited to being performed by this apparatus.

The apparatus comprises means for obtaining 410 and means for estimating 420. The means for obtaining 410 and means for estimating 420 may be a obtaining means and estimating means, respectively. The means for obtaining 410 and means for estimating 420 may be an obtainer and estimator, respectively. The means for obtaining 410 and means for estimating 420 may be an obtaining processor and estimating processor, respectively.

The means for obtaining 410 obtains, for each of plural pairs of an indication of a respective absolute time of arrival of a respective signal from a respective satellite and a respective satellite identification, a respective position of the respective satellite based on an information about an orbit of the respective satellite (S410). For each of the plural pairs of the respective absolute time of arrival and the respective satellite identification, the respective satellite is identified by the respective satellite identification. At least one of the absolute times of arrival is different from another one of the absolute times of arrival.

The means for estimating 420 estimates a location of a terminal based on the obtained plural positions and related plural sets of location data (S420). Each of the plural sets of location data comprises the respective absolute time of measuring and a respective parameter enabling to derive a transmit power of the respective signal. Each of the parameters may comprise the transmit power of the respective signal. Each of the parameters may comprise an identification of the respective signal. Thus, a location server may derive the transmit power from the identification and a database indicating (directly or by dynamical calculation) the transmit power of the respective signal dependent on the identification of the signal.

FIG. 16 shows an apparatus according to an example embodiment of the invention. The apparatus may be a terminal such as a UE or an element thereof. FIG. 17 shows a method according to an example embodiment of the invention. The apparatus according to FIG. 16 may perform the method of FIG. 17 but is not limited to this method. The method of FIG. 17 may be performed by the apparatus of FIG. 16 but is not limited to being performed by this apparatus.

The apparatus comprises means for checking 510 and means for providing 520. The means for checking 510 and means for providing 520 may be a checking means and providing means, respectively. The means for checking 510 and means for providing 520 may be a checker and provider, respectively. The means for checking 510 and means for providing 520 may be a checking processor and providing processor, respectively.

The means for checking 510 checks if location information for a terminal comprising the apparatus is available (S510). The location information enables determining a location of the terminal more precisely than on cell level. For example, the location information may comprise GNSS data. The location information may comprise a set of three indications, each indicating directly or indirectly a distance to a satellite at a respective absolute time.

If the location information is available (S510=yes), the means for providing 520 provides the location information together with a tracking area update report of the terminal to a network (S520).

FIG. 18 shows an apparatus according to an example embodiment of the invention. The apparatus may be a base station or a base station controller such as a gNB or eNB or an element thereof. FIG. 19 shows a method according to an example embodiment of the invention. The apparatus according to FIG. 18 may perform the method of FIG. 19 but is not limited to this method. The method of FIG. 19 may be performed by the apparatus of FIG. 18 but is not limited to being performed by this apparatus.

The apparatus comprises means for checking 610 and means for forwarding 620. The means for checking 610 and means for forwarding 620 may be a checking means and forwarding means, respectively. The means for checking 610 and means for forwarding 620 may be a checker and forwarder, respectively. The means for checking 610 and means for forwarding 620 may be a checking processor and forwarding processor, respectively.

The means for checking 610 checks if a tracking area update report received from a terminal comprises location information (S610). The location information enables determining a location of the terminal more precisely than on cell level. For example, the location information may comprise GNSS data. The location information may comprise a set of three indications, each indicating directly or indirectly a distance to a satellite at a respective absolute time.

If the location information is available (S610=yes), the means for forwarding 620 forwards the location information to a location server (S620).

FIG. 20 shows an apparatus according to an example embodiment of the invention. The apparatus comprises at least one processor 810, at least one memory 820 including computer program code, and the at least one processor 810, with the at least one memory 820 and the computer program code, being arranged to cause the apparatus to at least perform at least one of the methods according to FIGS. 7, 9, 11, 13, 15, 17, and 19 and related description.

In some example embodiments described hereinabove, the UE measures the TOAs at several occasions during a TAU reporting period until at least one of certain stop conditions (number of measurements etc.) is fulfilled, and then, it reports the measured TOAs along with related cell identifiers and an indication enabling to obtain the transmit time. In some example embodiments of the invention, the UE may measure the TOAs periodically (or event based), independent from the TAU reporting period. At the end of a TAU reporting period, the latest measurement results are reported.

In order to adapt the accuracy of the location estimation of the UE, the location server may take into account measurements of a period different from the whole set of location data sets obtained in a certain TAU reporting period. For example, it may take into account only a subset of (subsequent or not-subsequent) measurements within a TAU period to increase the accuracy in case of a fast moving UE or to decrease the accuracy in case of a stationary UE, or it may take into account measurements of two or more subsequent TAU reporting periods to decrease the accuracy in case of a fast moving UE or to increase the accuracy in case of a stationary UE. For the same purpose, the UE may be configured with a different TAU reporting period.

Hereinabove, some example embodiments are described where the UE is in RRC_IDLE mode when it measures the TOAs and/or received powers from the satellite(s). However, the invention is not limited to a UE in RRC_IDLE mode. For example, in some example embodiments of the invention, the UE may perform the measurements of TOAs and/or received powers from the satellite(s) while it is in RRC_CONNECTED mode. In this case, the UE may report the corresponding location information to the location server in the same way as other location information such as a GPS measurement.

If the UE is in RRC_IDLE mode, in some example embodiments of the invention, the UE may report the location information in a message different from the TAU report. Such a message is to be newly defined.

The term "A is reported along with B" means that the receiver of the report understands that A and B are associated to each other. The report may indicate the association in any of plural ways. For example, A and B may be reported as a pair of data in a single information element, or some metadata may indicate that A and B are associated to each other.

An absolute time may be indicated in various ways. For example, it may be indicated in seconds from a defined starting point or as a system frame number (SFN). Correspondingly, a relative time may be indicated in various ways, e.g. as a number of seconds or as a number of system frames. The indication of the absolute time may correspond to the indication of the relative time or may be different therefrom.

Some example embodiments of the invention are described which are based on a 3GPP network (e.g. NR). However, the invention is not limited to NR. It may be applied to any generation (3G, 4G, 5G, etc.) of 3GPP networks. However, the invention is not limited to 3GPP networks. It may be applied to other radio networks, too, which provide communication via satellite links.

A UE is an example of a terminal. However, the terminal (UE) may be any device capable to connect to the (3GPP) radio network via the channel such as an MTC device, an IoT device etc.

The definitions indicated in the present description are based on the current 3GPP standards. However, they do not limit the invention. Other definitions according to the same or a corresponding concept are applicable to some example embodiments of the invention, too.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

According to the above description, it should thus be apparent that example embodiments of the present invention provide, for example, a terminal (such as a UE), or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, a satellite acting as a base station (e.g. gNB or eNB), or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, a location server (e.g. E-SMLC, SMLC, or SLP), or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof.

It is to be understood that what is described above is what is presently considered the preferred example embodiments of the present invention. However, it should be noted that the description of the preferred example embodiments is given by way of example only and that various modifications may be made without departing from the scope of the invention as defined by the appended claims.

The foregoing description has provided by way of non-limiting examples a full and informative description of the exemplary embodiments. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. An apparatus comprising:
at least one processor and at least one memory including a computer program code, the at least one memory and the computer program code configured to, with the at least one processor, cause the apparatus at least to:
measure, during a reporting period, a first absolute time of arrival of a first signal from a first satellite identified by a first cell identifier, a second absolute time of arrival of a second signal from a second satellite identified by a second cell identifier, and a third absolute time of arrival of a third signal from a third satellite identified by a third cell identifier;
report, after the reporting period has elapsed, an indication of the first absolute time of arrival along with the first cell identifier and a first parameter enabling to derive an absolute transmit time of the first signal, an indication of the second absolute time of arrival along with the second cell identifier and a second parameter enabling to derive an absolute transmit time of the second signal, and an indication of the third absolute time of arrival along with the third cell identifier and a third parameter enabling to derive an absolute transmit time of the third signal;

wherein the at least one processor and the computer program code configured to cause the apparatus to measure comprises the at least one processor and the computer program code configured to cause the apparatus to:

measure the first absolute time of arrival within a set first measurement interval in the reporting period; and measure the second absolute time of arrival within a set second measurement interval in the reporting period; and the second measurement interval does not overlap the first measurement interval.

2. The apparatus according to claim 1, wherein:
the first satellite is the same as the second satellite, and
a time difference between the second absolute time of arrival and the first absolute time of arrival is larger than a set minimum time period.

3. The apparatus according to claim 1, wherein a terminal comprising the apparatus is in IDLE mode, and the at least one processor and the computer program code configured to cause the apparatus to report comprises the at least one processor and the computer program code configured to cause the apparatus to report to a fourth satellite at a tracking area update of the terminal.

4. The apparatus according to claim 1, wherein a terminal comprising the apparatus is in IDLE mode, and the at least one processor and the computer program code configured to cause the apparatus to report comprises the at least one processor and the computer program code configured to cause the apparatus to report to a network at a tracking area update of the terminal.

5. The apparatus according to claim 3, wherein the at least one processor and the computer program code configured to cause the apparatus to report comprises the at least one processor and the computer program code configured to cause the apparatus to report regardless of whether or not the terminal is connected to any of the first, second, and third satellites.

6. The apparatus according to claim 1, wherein the at least one processor and the computer program code are configured to further cause the apparatus to:
check if a stop condition is fulfilled in the reporting period; and
prohibit the apparatus from measuring any of the first, second or third absolute time of arrivals in the reporting period after the stop condition is fulfilled in the reporting period.

7. The apparatus according to claim 1, wherein the at least one processor and the computer program code are configured to further cause the apparatus to:
calculate a time difference of arrival between the first absolute time of arrival and the second absolute time of arrival, and
report an indication of the time difference of arrival as the indication of the second absolute time of arrival.

8. The apparatus according to claim 1, wherein the at least one processor and the computer program code are configured to cause the apparatus to:
measure at least one of the first, second, and third absolute times of arrival as a respective time difference relative to an absolute time; and
report the respective time difference and the absolute time as the respective one of the at least one of the first, second, and third absolute times of arrival.

9. The apparatus according to claim 1, wherein at least one of the first, second, and third parameters is the respective absolute transmit time, and the at least one processor and the computer program code are configured to cause the apparatus to:
retrieve the respective absolute transmit time from the respective one of the first, second and third signals.

10. An apparatus comprising:
at least one processor and at least one memory including a computer program code, the at least one memory and the computer program code configured to, with the at least one processor, cause the apparatus at least to:
measure, during a reporting period, a first received power of a first signal from a first satellite identified by a first cell identifier, a second received power of a second signal from a second satellite identified by a second cell identifier, and a third received power of a third signal from a third satellite identified by a third cell identifier;
report, after the reporting period has elapsed, an indication of the first received power along with the first cell identifier, a first absolute time when the first received power is measured, and a first parameter enabling to derive a transmit power of the first signal, an indication of the second received power along with the second cell identifier, a second absolute time when the second received power is measured, and a second parameter enabling to derive a transmit power of the second signal, and an indication of the third received power along with the third cell identifier, a third absolute time when the third received power is measured, and a third parameter enabling to derive an absolute transmit power of the third signal;

wherein the at least one processor and the computer program code configured to cause the apparatus to measure comprises the at least one processor and the computer program code configured to cause the apparatus to:

measure the first received power within a set first measurement interval in the reporting period; and measure the second received power within a set second measurement interval in the reporting period; and the second measurement interval is different from the first measurement interval by a minimum time interval.

11. The apparatus according to claim 10, wherein:
the first satellite is the same as the second satellite.

12. The apparatus according to claim 10, wherein a terminal comprising the apparatus is in IDLE mode, and the at least one processor and the computer program code configured to cause the apparatus to report comprises the at least one processor and the computer program code configured to cause the apparatus to report to a fourth satellite at a tracking area update of the terminal.

13. The apparatus according to claim 10, wherein a terminal comprising the apparatus is in IDLE mode, and the at least one processor and the computer program code configured to cause the apparatus to report comprises the at least one processor and the computer program code configured to cause the apparatus to report to a network at a tracking area update of the terminal.

14. The apparatus according to claim 12, wherein the at least one processor and the computer program code configured to cause the apparatus to report comprises the at least one processor and the computer program code configured to cause the apparatus to report regardless of whether or not the terminal is connected to any of the first, second, and third satellites.

15. The apparatus according to claim 10, wherein the at least one processor and the computer program code are configured to further cause the apparatus to:
   check if a stop condition is fulfilled in the reporting period; and
   prohibit the apparatus from measuring any received power in the reporting period after the stop condition is fulfilled in the reporting period.

16. An apparatus comprising:
   at least one processor and at least one memory including a computer program code, the at least one memory and the computer program code configured to, with the at least one processor, cause the apparatus at least to:
   measure, within a set first measurement interval during a set reporting period, at least one of a first time of arrival of a first signal from a terminal, a first angle of arrival of a second signal from the terminal, and a first round trip time of a third signal from the terminal and to measure, within a set second measurement interval during the reporting period, at least one of a second time of arrival of a fourth signal from the terminal, a second angle of arrival of a fifth signal from the terminal, and a second round trip time of a sixth signal from the terminal;
   report, after the reporting period has elapsed, an identification of the terminal, an identification of a satellite comprising the apparatus, an indication of the measured at least one of the first time of arrival, the first angle of arrival, and the first round trip time along with an identification of the respective at least one of the first, second, and third signals, and a respective first absolute measuring time when the respective at least one of the first time of arrival, first angle of arrival, and first roundtrip time is measured, and an indication of the measured at least one of the second time of arrival, the second angle of arrival, and the second round trip time along with an identification of the respective at least one of the fourth, fifth, and sixth signals, and a respective second absolute measuring time when the respective at least one of the second time of arrival, second angle of arrival, and second roundtrip time is measured, wherein
   the first measurement interval does not overlap the second measurement interval.

17. The apparatus according to claim 16, wherein at least one of the following pairs of conditions applies:
   if the apparatus is configured to measure the first time of arrival the apparatus is configured to measure the second time of arrival, and if the apparatus is configured to measure the second time of arrival the apparatus is configured to measure the first time of arrival;
   if the apparatus is configured to measure the first angle of arrival the apparatus is configured to measure the second angle of arrival, and if the apparatus is configured to measure the second angle of arrival the apparatus is configured to measure the first angle of arrival; and
   if the apparatus is configured to measure the first roundtrip time the apparatus is configured to measure the second roundtrip time, and if the apparatus is configured to measure the second roundtrip time the apparatus is configured to measure the first roundtrip time.

* * * * *